United States Patent Office 3,629,397
Patented Dec. 21, 1971

3,629,397
THERAPEUTIC AND DIAGNOSTIC ALLERGENIC EXTRACTS AND PROCESS FOR PREPARING SAME
Walter Edward Waterbury, Cheshire, and Alice Cheryl Barnes and Herman Henry Walchli, Jr., West Haven, Conn., assignors to Miles Laboratories, Inc., Elkhart, Ind.
No Drawing. Filed Jan. 24, 1969, Ser. No. 793,911
Int. Cl. A61k 23/00
U.S. Cl. 424—91                                18 Claims

ABSTRACT OF THE DISCLOSURE

A process for preparing therapeutic and diagnostic antigenic or allergenic extracts and the product obtained thereby comprising extracting substances known to contain physiologically active principles which elicit allergenic responses with an aqueous extracting fluid, separating the aqueous extracting fluid containing the water-soluble active principles from the insoluble material therein, extracting the insoluble material with an aqueous-organic solvent or non-aqueous organic solvent extracting fluid, separating the organic solvent extracting fluid from the insoluble material therein, separating the active principles contained in the organic solvent from the organic solvent and finally preferably combining the initial aqueous extracting fluid containing the water-soluble active principles with the active principles obtained from the organic solvent extracting fluid.

BACKGROUND OF THE INVENTION

It has long been known that various individuals upon contacting, and particularly inhaling, certain naturally occurring and synthetic organic particles or substances develop characteristic allergic reactions such as sneezing, activation of mucus glands, local edema, skin eruptions and vasodilation. These reactions are commonly called "hay fever" and even though the reaction in itself is not usually serious, it may lead to complications, both physiologically and psychologically. In a small child the constant presence of an allergic condition often causes permanent deformities in the body and particularly the facial structure not to mention the psychological effects of an ever present discomfort. Asthmatic conditions are also intimately connected with allergic reactions and may also cause more serious complications. Medical science now recognizes the hay fever malady as a serious condition which must be treated with care and thoroughness.

In this regard, it has likewise been known for some time that extracts of the above noted allergenically or antigenically active substances, when injected subcutaneously, alleviate these allergic reactions. The exact physiological mechanism of this treatment, known in the art as hyposensitization, has not yet been completely and satisfactorily explained. Various theories however have been brought forward which attempt an explanation. One such theory assumes the formation of so-called blocking or neutralizing antibodies caused by injecting the extract, while another theory postulates that such treatment encourages the formation of union between antigen (or allergen) and antibody in the free circulation rather than in the shock tissue.

DESCRIPTION OF THE PRIOR ART

In the preparation of such allergenic extracts, it has been common practice in the past to simply extract the offending organic substance causing the allergic reaction with a physiologically acceptable aqueous extracting fluid such as a saline solution or a slightly alkaline saline solution. After separating the extraction fluid from the residue, this solution containing the active principles is sterilized and simply used as such, after, of course, making the proper serial dilution thereof. In such an extraction procedure the physiologically acceptable extracting fluid is selected and designed to protect the structural integrity of the antigenic molecule.

Recently, however, a method has been devised which results in a more complete and effective allergenic extract. This process is described in U.S. Patents Numbers 3,148,121 and 3,248,122 and briefly comprises treating a whole undefatted allergenic substance with an aqueous heterocyclic tertiary amine extracting fluid, separating the liquid phase containing the active principles from the residue, discarding the residue and, in order to remove the heterocyclic tertiary amine from the active principles, adding water and an alum solution to the extract to precipitate the active principles therefrom. The precipitate is then washed several times with water to remove all of the heterocyclic tertiary amine and excess alum and is finally resuspended in a physiologically acceptable vehicle such as, for example, a phosphate buffer solution.

Initially, it was believed that the inclusion of the heterocyclic tertiary amine in the process merely resulted in a more complete allergenic extract, since the amine soluble constituents were included in the extract as well as the water-soluble proteinaceous and carbohydrate fractions. Now, however, it is believed that the reactive chemical nature of the heterocyclic tertiary amine may cause a structural modification of the antigenic molecule which results in an allergenic treatment extract which is effective and relatively free from constitutional side reactions.

As effective and advantageous as these heterocyclic tertiary amine extracted-alum precipitated allergenic extracts (hereinafter called PEAP extracts, since pyridine is the preferable heterocyclic tertiary amine used in such a process) have been found to be, several limitations have appeared over the years. In this regard it was found that this type of extract could not be used for skin testing purposes, a situation clinical allergists usually wish to avoid, since they prefer to use the same extract for both diagnosis and treatment. Such a procedure using the same extract insures that the treatment involves the exact antigen found to be the cause of the allergic skin reaction. The above limitation of PEAP extracts is believed to be due to the insolubility of the precipitate and/or the formation of a complex between the heterocyclic tertiary amine-extracted antigen and the alum used in the precipitation of the antigen from the extracting fluid.

Moreover, the process parameters for preparing PEAP antigens using the prior art methods are rather lengthy, and the yield leaves much to be desired, i.e., in the range of about 50% of the PNU's (protein nitrogen units) originally extracted.

In addition to the above shortcomings, there have also been some reported situations where an aqueous type extract has been effective where the PEAP extract has been relatively ineffective and vice versa.

OBJECTS OF THE PRESENT INVENTION

It is therefore an object of the present invention to provide a more versatile and effective allergenic extract than that produced by prior art aqueous and PEAP methods.

It is another object to provide an improved process for preparing allergenic testing extracts and long acting treatment extracts using a common antigenic extracting procedure.

It is still another object to provide a combination aqueous-organic solvent extracting procedure whereby substantially all antigenic material is recovered in the processing thereof.

SUMMARY OF THE INVENTION

These and other objects which will become apparent from the following description and the claims appended thereto are achieved by (1) extracting the allergenically active substance with an aqueous extracting fluid, (2) separating the aqueous extracting fluid containing the water-soluble active principles from the insoluble material therein, (3) extracting the insoluble material with an organic solvent extracting fluid, (4) separating the organic solvent extracting fluid from the insoluble material therein, (5) separating the active principles contained in the organic solvent from the organic solvent, and preferably, (6) combining the water-soluble active principles with the organic solvent soluble active principles.

DESCRIPTION OF THE PREFERRED EMBODIMENTS

The process according to the present invention is applicable to all allergenically active substances both of natural origin and synthetically prepared. Such substances include dusts, as ordinary dust found in homes and collected in vacuum sweepers and dust found in manufacturing facilities, such as sawdust; epithelials, such as cat, dog, horse and rabbit dander; feathers, such as from geese and chickens; seeds, such as cottonseed and Kapok; insects and emanations from insects, such as bees, hornets, and mosquitos; pollens from trees, grasses and weeds, such as ragweed, orchard grass, maple trees, poplar trees; molds, such as *Aspergillus niger* and *Alternaria*; complex synthetic chemicals, such as antibiotics, and the like.

Initially, the allergenically active substance is extracted with a strictly aqueous extracting fluid. This initial extraction procedure is the same as that used in the preparation of prior art aqueous allergenic extracts and simply involves contacting the allergenically active substance with water or an aqueous buffered or isotonic extracting fluid. Such extracting fluids include buffered saline or Evan's solution; Cocoa's solution comprising sodium bicarbonate, sodium chloride and phenol; glycerosaline or Stier's solution; dextrose or Ungar's solution; phosphate buffered solutions; physiological saline; tenth normal sodium hydroxide solution; alcohol saline solution; dextrose-saline solution; and so forth. Such solutions are well known to those skilled in the art of treating allergic patients and a more complete formulation including concentration of ingredients may be found in any elementary textbook on allergy. These solutions are all mild extracting procedures and are designed to protect the structural integrity of the offending allergen or antigen molecule. These aqueous extracting solutions usually have an adjusted pH of from about 6.5 to 8.0.

In preparing this initial aqueous extract of the allergen, the natural substance, after removal of physical contaminants and properly pulverizing or subdividing, if necessary, is contacted with the extracting fluid for a period of from about one (1) hour to three (3) days or more with occasional agitation. Preferably the extraction is made with continuous agitation for a four (4) hour period. The allergen may also be defatted prior to contacting same with the aqueous extracting fluid; however, in certain instances this is either unnecessary or is believed to remove valuable antigenic material.

After the initial extraction with the aqueous fluid, the insoluble material or residue contained in the extracting fluid is separated from the aqueous fluid by a process such as centrifuging or filtering and washed several times with water or additional extracting fluid.

The insoluble material or residue left from the initial extraction with the aqueous fluid is then extracted and treated with an organic solvent to remove the water-insoluble active principles therefrom. Although a nonaqueous organic solvent may be used, the preferable fluid for use in this extraction comprises a mixture of an aqueous phase and a miscible organic solvent phase. The latter constituent of this extracting fluid may comprise any of numerous organic solvents such as dioxane, 2-propanol, dimethylsulfoxide, ethylenediamine, hydrazine, N-methylacetamide, piperidine, formamide, N,N-dimethylformamide, N,N-dimethylacetamide, and other like organic substances known to be solvents for proteinaceous substances. Preferably the organic solvent is a basic nitrogen containing substance such as an amine, and more preferably yet a heterocyclic tertiary amine such as for example, pyridine, pyridine derivatives such as lutidine, quinoline, collidine, picoline and the like. The organic solvent system may also comprise a mixture of solvents as well as containing an aqueous phase.

Although the exact chemical effect of certain of the organic solvents, such as pyridine, on the antigen molecule or structure thereof is not known with any degree of certainty, it is believed that the highly polar or basic nature of these solvents cause them to react with the water-insoluble antigens to form a compound therewith, or somehow alter the complex molecular structure of the protein, carbohydrate, lipoprotein or polypeptide which forms the basis for the allergenic nature of the offending substance.

The second and optional constituent of this extracting fluid, that is, the aqueous phase, may comprise plain distilled water or, preferably, a saline and/or alkaline, aqueous solution. In this regard, sodium bicarbonate, sodium chloride, sodium hydroxide, phosphate buffers and the like may be employed. When substances having an alkaline nature such as a heterocyclic tertiary amine are used in the extracting fluid, this second aqueous constituent may also consist of a buffer which adjusts the pH to a more neutral value. The resulting pH of the final extracting fluid prepared by mixing the amine organic solvent phase and the aqueous phase, may be from about pH 7.5 to pH 12.0 and preferably is set in a more narrow pH range of from about pH 9.0 to pH 12.0. Since a wide variety of allergenic substances have been found adaptable to the present process, the pH of the extracting fluid and the composition thereof may be varied considerably. For example, ragweed pollen is known to contain a high and toxic fat or lipid content which has been suggested to contribute heavily to the allergenic nature of this substance. In extracting this weed pollen one may wish to increase the ratio of organic solvent phase to aqueous phase to insure solubility of all the lipid material. However, about equal parts of organic solvent phase and aqueous phase have been found to result in an extracting fluid having broad applicability.

This second extracting step usually comprises mixing the insoluble material with the extracting fluid and allowing the mixture to remain at a temperature of about from 20° C. to 25° C. for up to about eleven (11) days either with or without agitation. The residue is then separated from the liquid phase which at this time contains the treated and solubilized water-insoluble or organic solvent soluble active allergenic principles, by allowing the insoluble residue to settle out, centrifuging the mixture or a filtration process such as vacuum filtration. The second residue is then discarded.

At this stage of the present process, the water-insoluble, organic solvent soluble active principles must be separated from the organic solvent or second extracting fluid which is usually physiologically unacceptable. This separation process may comprise the addition of a precipitating agent such as potassium aluminum sulfate whereby the active principles are insolubilized or removing the solvent by a physical process. The first process is known in the art and described in the aforementioned U.S. Pats. Nos. 3,148,121 and 3,148,122. The preferable process, however, is to physically remove the organic solvent from the active principles contained therein. This may be achieved by using any of the known methods of separating a solvent system from a substance dissolved therein. Such methods include, inter alia, freeze drying, spray drying, vacuum drying, the use of rotating vacuum drying apparatus and the like. The temperatures employed in this drying step may be from a minimum required to volatilize the extracting fluid at the pressure used, up to about 85° C.; the latter being the temperature used in a spray drying procedure where the thermo-labile antigen is only momentarily subjected to such an extreme temperature. The pressure employed in the volatilization system likewise depends upon the specific procedure used and may vary from atmospheric pressure or slightly thereabove down to about 30 mm. of mercury such as would be employed in a freeze drying technique.

It has also been found that in order to remove the last vestiges of the aqueous organic solvent extracting fluid, it is preferable to allow the substantially dry particulate antigen resulting from the volatilization step to remain in a vacuum dessicator for about 24 hours. This step may be accomplished at room temperature or up to about 45° C.

The result of the above procedure is a dry, particulate allergenically or antigenically active substance which has been treated with the highly reactive extracting fluid, contains substantially all of the water-insoluble active principles from the original offending substance and, as will be seen hereinafter is an extremely versatile antigenic extract from the standpoint of ultimate use.

Another means for separating the water-insoluble active principles from the organic solvent system comprises the use of dialysis. When an aqueous-pyridine extracting fluid is used, it has been found that it is a comparatively easy step to remove the pyridine from the extract using this procedure.

To recapitulate the process of the present invention to this point: two separate extracts have been prepared (1) the first extract comprising an aqueous solvent system containing the water-soluble active principles, and (2) the treated, organic solvent soluble active principles in any of several forms, i.e., an insoluble particulate allergen such as by alum precipitation, an aqueous solution of the allergen such as obtained by dialysis or a dry powder such as obtained by volatilization of the organic solvent system.

Although the two separate extracts could be used individually, it is preferable and more convenient to recombine the two extracts. This results in a single extract having several important advantages as will be fully elucidated hereinafter. The recombination will vary depending upon the physical form of the organic-solvent soluble antigen after removal of the organic solvent therefrom. When the solvent has been dialyzed away it is a simple matter of analyzing the remaining solution for activity and simply mixing the proper portions of first and second extracts. As used hereinafter the aqueous extract will be termed the first extract and the active principles extracted by the organic solvent termed the second extract.

When he organic solvent system has been removed by a process of volatilization, and the second extract active principles are in the form of a dry powder, then the simplest procedure of combining the first and second extracts is by simply reconstituting the dry powder with the first extract. The resultant clear aqueous extract may then be sterilized and standardized as will be described hereinafter.

Another variation of the present invention comprises in combining the first extract with the insolubilized aluminum precipitate of the second extract prepared as described in U.S. Pats. Nos. 3,148,121 and 3,148,122. The result is a combination aqueous first extract and a long acting alum precipitated second extract.

It will be appreciated that the recombination of the first and second extracts may be accomplished in a wide range of ratios depending upon the particular allergen being extracted as well as the sensitivity of the individual to the various antigens in the offending substance.

At this stage it will be appreciated that the combination extract may be further processed to provide an allergenic extract in a selected one of various forms known in the art of using allergenic extracts. Thus, the combination may simply be diluted with a physiologically acceptable aqueous solvent system and used as both a diagnostic skin testing extract and a hyposensitization treatment extract. Such physiologically acceptable fluids include buffered saline or Evan's solution, Coca's solution comprising sodium bicarbonate, sodium chloride and phenol, glycerosaline or Stier's solution, dextrose or Ungar's solution, phosphate buffered solutions, and the like.

A second method of further processing the combined extract, when in a completely soluble form may comprise the addition of an aluminum compound such as potassium alum or aluminum hydroxide to insolubilize the antigen and prepare a therapeutic dosage form having slow release properties. In this regard it has unexpectedly been found that the insolubilized precipitate or adsorption product using the combination aqueous and organic solvent treated extract of the present invention is quite superior to prior art alum precipitated antigers from defatted strictly aqueous extracted solutions thereof. Whereas such prior art preparations are gelatinous in nature and pharmaceutically unacceptable, the present preparations are particulate, homogeneous suspensions and are pharmaceutically elegant in appearance.

It should be noted here that it has also unexpectedly been found that the yield of precipitate from the reconstituted extract using an aluminum compound to insolubilize the antigen, is dramatically greater than that obtained by using the prior art PEAP process. For example, yields of about 40–50% are achieved by using the prior art PEAP process whereas in the present process about 70–90% yield is obtained. This yield is calculated on the basis of protein nitrogen in the extracting fluid as compared to protein nitrogen in the insolubilized precipitate or adsorption product.

In this insolubilizing procedure, a stoichiometric amount of aluminum may be added and the suspension simply extended out to the proper potency with additional aqueous fluid; or excess aluminum compound added and the precipitate or adsorption product removed from the supernanant, washed and resuspended in a physiologically acceptable aqueous fluid.

In order to insure that the allergenic extract is sterile, it is the usual practice to pass a solution containing the thermolabile antigen extract through a bacterial filter, more commonly called a Seitz, micropore, Millipore® or membrane filter. Such procedures are well known in the art and are described in various texts relating thereto. In the present invention such sterilization may be accomplished in any liquid phase so long as the antigen is in solution. For example, both the first and second extracts may be sterilized or the final combination extract may be sterilized by filtration. Of course it will be appreciated that a spray drying technique may effect a sterilization of the resulting dry product when this technique is used to prepare the second extract and make such a bacterial filtration step unnecessary.

Referring now to the mode of use of the present preparation, such techniques are also well known in the art and may be broken down into two categories, i.e., (1) skin testing or diagnostic extracts, and (2) treatment or therapeutic extracts. The testing or diagnostic extracts are primarily aqueous in nature and are used by placing a drop of the specific extract on the skin of the individual or animal being tested and abrading the surface of the skin under the extract. If after a rather short period of time an eruption or wheal appears, it is strongly indicated that the individual is allergic to the particular antigen used in the test. Another testing method comprises the intracutaneous injection of the extract and a subsequent observation of wheal formation.

The second category of extracts, the treatment of therapeutic extracts, may comprise the aqueous, aluminum precipitated, repository and similar extracts. The use of such treatment extracts comprises the subcutaneous injection of an extremely dilute solution of the antigen followed by subsequent daily or weekly injections of gradually increasing concentration. Because of the extremely wide range of sensitivities of various individuals and the different release characteristics of the various therapeutic forms of the antigen, a regime of treatment is decided upon by the clinician on an individual basis.

In regard to dosage or potency of extract, the products of the present invention may be concentrated or diluted according to the basic strength of the initial extract and the desired potency of the final extract. The most common, although not entirely satisfactory means for standardizing the extract, is the analysis of the solution for PNU or protein nitrogen units. The deficiency of this method obviously is that all the antigenic fractions of the extract are not necessarily protenaceous but may be carbohydrate, lipid or other non-nitrogenous molecules. In regard to potency of extract the usual practice is to standardize treatment extracts to from about 10 to about 5,000 PNU depending on the correlation between antigenicity and protein nitrogen. Treatment extracts are usually set at from about 10 PNU to about 20,000 PNU, the lower potency extracts being used in the initial phases of the hyposensitization therapy and the higher potency extracts as a sustaining or maintenance dose at greater time intervals.

The present invention is illustrated by the following examples but there is no intention to limit the scope of the present process or product thereto.

Example 1

Fifty grams (50 g.) of short ragweed (*Ambrosia artemisifolia*) pollen was defatted five (5) times with 250 ml. portions of ethyl ether. The ether, in each defatting operation, was removed by decanting after allowing the pollen residue to settle out. The ether containing the lipid fraction of the pollen was discarded and the defatted pollen dried under reduced pressure. The dried defatted pollen was then extracted with 350 ml. of distilled water at 25° C. for five (5) hours with constant stirring. The extracting fluid was then filterded through a Buchner funnel and the water-insoluble pollen material on the filter washed several times with additional water. The filtrate and washings were then combined and analyzed for PNU. It was found that about 25% of the original pollen weight or 122,800 PNU was extracted by the aqueous fluid. Further extraction with water failed to remove any additional active principles from the pollen residue.

The water-insoluble pollen residue from the first aqueous extraction was then further extracted with 350 ml. of a 1:1 (vol./vol.) solution of pyridine and 0.1 N sodium hydroxide solution for three (3) days at room temperature. The extraction vessel was occasionally shaken during this three (3) day interval. This second extraction fluid was then filtered through a Buchner funnel, dialyzed against distilled water using a cellulose membrane to remove the pyridine, and centrifuged for fifteen (15) minutes at 37,000 RCF. The clear supernatant, termed the second extract, contained 312,000 PNU and was assayed for Antigen E or Antigen E-like material by the Ouchterlony technique using Rabbit Antiserum for Antigen E. Precipitin lines were observed indicating the presence of Antigen E-like material. This specific constituent or ragweed pollen is considered to be the primary cause of allergenic reactions in ragweed sensitive individuals.

The first and second extracts were then combined in a 1:1 ratio. The combination extract is useful in diagnosing and treating (hyposensitizing) individuals allergic to ragweed pollen.

Example 2

Two (2) volumes of the first and second extracts, prepared as in Example 1 and combined in a ratio of 1:1, were treated with 1.1 volumes of 2% potassium aluminum sulfate in 0.25 normal $H_2SO_4$. The precipitate which formed (yield 73%) was washed with distilled water and resuspended in phosphate buffer. This suspension is useful as a slow release allergenic extract in treating individuals susceptible to ragweed pollen.

Examples 3–7

Example 1 was repeated except house dust, timothy pollen, chicken feathers and birch tree pollen were substituted for ragweed pollen. The combined extracts are useful for diagnosis of allergic reactions by skin testing or for hyposensitization therapy.

What is claimed is:

1. A process for preparing an extract useful for hyposensitization therapy and skin testing or diagnosis of allergies of an active substance capable of eliciting an allergenic response and containing physiologically active principles, which process comprises:
   (A) extracting the active substance with a first aqueous extracting fluid;
   (B) separting and retaining the aqueous extracting fluid containing the water-soluble active principles from the water insoluble portion of the substance;
   (C) extracting the water insoluble portion of the substance with a second extracting fluid having a pH of about 7.5 to 12.0 comprising a mixture of an aqueous phase and a heterocyclic tertiary amine selected from the group consisting of pyridine, quinoline, lutidine, collidine and picoline:
   (D) separating the second extracting fluid containing the organic solvent soluble active principles from the water and organic solvent insoluble portions of the substance and,
   (E) separating and retaining the active principles contained in the organic solvent from the organic solvent.

2. A process as in claim 1 wherein the water-soluble active principles are combined with the organic solvent soluble active principles.

3. A process as in claim 1 wherein the heterocyclic tertiary amine is pyridine.

4. A process as in claim 1 wherein the organic solvent is a combination of dilute sodium hydroxide solution and pyridine.

5. A process as in claim 1 wherein the separation of the active principles from the organic solvent is accomplished by means of dialysis.

6. A process as in claim 1 wherein the substance capable of eliciting an allergenic response is an inhalant.

7. A process as in claim 6 wherein the inhalant is selected from the group of allergens consisting of pollens, house dust, epithelium, molds, insect materials, seeds and feathers.

8. A process as in claim 1 wherein an aluminum compound is added to the active principles in solution thereby insolubilizing the said active principles.

9. A process as in claim 8 wherein the aluminum compound is potasisum aluminum sulfate.

10. The product prepared by the process of claim 1.

11. The product prepared by the process of claim 2.

12. The product prepared by the process of claim 3.
13. The product prepared by the process of claim 4.
14. The product prepared by the process of claim 5.
15. The product prepared by the process of claim 6.
16. The product prepared by the process of claim 7.
17. The product prepared by the process of claim 8.
18. The product prepared by the process of claim 9.

References Cited
UNITED STATES PATENTS 3,148,121   9/1964   Strauss _____ 424—91
3,148,122   9/1964   Strauss _____ 424—91

SHEP K. ROSE, Primary Examiner

PO-1050
(5/69)

UNITED STATES PATENT OFFICE
CERTIFICATE OF CORRECTION

Patent No. 3,629,397  Dated December 21, 1971

Inventor(s) Walter Edward Waterbury, Alice Cheryl Barnes and Henry Herman Walchli, Jr.

It is certified that error appears in the above-identified patent and that said Letters Patent are hereby corrected as shown below:

| | |
|---|---|
| Column 5 - line 69 | Change second word from "he" to -- the -- |
| Column 6 - line 35 | Change fourth word from "antigers" to -- antigens -- |
| Column 6 - line 40 | Change last word from "appearence" to -- appearance -- |
| Column 7 - line 32 | Change fourth word from "protenaceous" to -- proteinaceous -- |
| Column 7 - line 58 | Change fourth word from "filterded" to -- filtered -- |
| Column 8 - line 5 | Change sixth word from "or" to -- of -- |
| Column 8 - line 37 | Change first word from "separting" to -- separating -- |
| Column 8 - line 73 | Change third word from "potasisum" to -- potassium -- |

Signed and sealed this 11th day of July 1972.

(SEAL)
Attest:

EDWARD M. FLETCHER, JR.
Attesting Officer

ROBERT GOTTSCHALK
Commissioner of Patents